United States Patent [19]
Rasenberger

[11] 3,885,680
[45] May 27, 1975

[54] APPARATUS PROVIDED AT PRESSES FOR THE LIFTING AND CONVEYING OF WORKPIECES

[75] Inventor: Otto Rasenberger, Göppingen, Germany

[73] Assignee: L. Schuler GmbH, Germany

[22] Filed: Apr. 1, 1974

[21] Appl. No.: 456,856

[30] Foreign Application Priority Data
Mar. 30, 1973 Germany .......................... 2315950

[52] U.S. Cl. .................. 214/1 BB; 198/218
[51] Int. Cl. ............................................ B65g 25/04
[58] Field of Search ........ 214/1 R, 1 B, 1 BB, 1 BD, 214/1 BS, 1 BT, 1 BV; 198/19, 20 R, 218; 83/277; 72/421

[56] References Cited
UNITED STATES PATENTS

| | | | |
|---|---|---|---|
| 2,836,280 | 5/1958 | Hallahan | 214/1 BB X |
| 3,655,070 | 4/1972 | Haydv | 198/218 X |
| 3,707,908 | 1/1973 | Mera et al. | 214/1 BB X |

Primary Examiner—Frank E. Werner
Attorney, Agent, or Firm—Craig and Antonelli

[57] ABSTRACT

Apparatus for lifting and conveying workpieces in a press or the like including work handling fixtures attached to a bar which is axially reciprocably movable along the work stations of the press. The drive system for imparting lifting motions to a lifting element of the work handling fixtures includes a driven lever and a rocker arm which are pivotal about mutually parallel axes fixed in a fixture housing. The driven lever and rocker arm are joined together by a coupler which is also attached to the lifting element. The driven lever is pivotally joined to the coupler at a position intermediate the attachment point of the lifting element and coupler and the junction point of the coupler and the rocker arm. The simple pivotal connection of the drive system to the reciprocating drive rod which moves the driven lever optimizes the lifting movement while minimizing the space taken up by the fixture when not in a lifting position. The housing for the fixture is constructed so as to extend in the lifting direction outwardly of all of the elements of the fixture when not in the lifting position. In gang press arrangements, a plurality of similar fixtures are arranged at each side of the press station and are drivingly interconnected to effect sequential handling of workpieces through the work stations.

21 Claims, 3 Drawing Figures

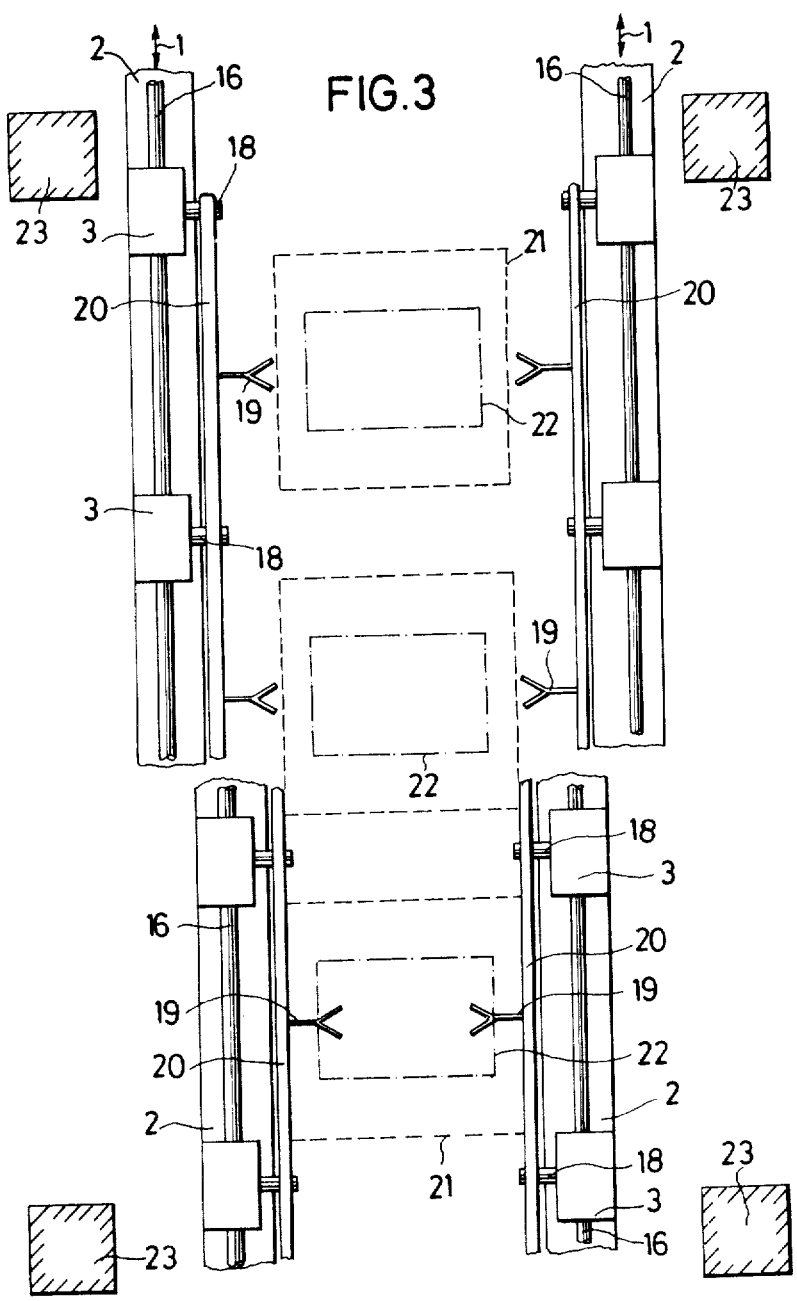

APPARATUS PROVIDED AT PRESSES FOR THE LIFTING AND CONVEYING OF WORKPIECES

BACKGROUND AND SUMMARY OF THE INVENTION

This invention relates to apparatus provided at or in presses and the like for the lifting and conveying of workpieces, for example for lifting the workpieces out of a tool. More particularly, the present invention relates to apparatus comprising at least one bar or rail reciprocatable within the press, to which is attached at least one workpiece handling fixture for seizing the workpiece. This workpiece handling fixture can seize the workpiece, for example semifinished workpieces or pressed or punched-out sheet-metal parts, and feed such workpieces or parts by means of the movement of the bar to a tool or withdraw such workpieces or parts from the press.

Since the space is limited in height in the tool or die zone of a press, especially when the tool is closed, the invention is based on the problem to construct the drive for the workpiece handling fixture so that the drive has minimum dimensions in the direction of the lifting of the workpieces, so that the bar, the workpiece handling fixture, and the drive can also be freely movable in a direction toward another work station between the latter and the press frame when the tool is closed (press with tool die parts closest to one another). Previously contemplated apparatus of this type includes slideways for the movement of the bar in the lifting or stroke direction, the length of these slideways exceeding the stroke measure and thus requiring a large amount of space in the stroke direction.

A preferred embodiment of the present invention avoids the above-mentioned disadvantage (requirement for large amount of space in the stroke direction) by providing the drive system of the workpiece handling fixture with a driven lever and a rocker arm which are pivotal about mutually parallel axes and are connected with each other by means of a coupler or coupling means carrying a lifting element or rise-and-fall mechanism for the workpiece. The coupler is hingedly connected to the driven lever between the lifting element and the joint connecting the coupler with the rocker arm.

The advantages attained by the apparatus of the present invention resides especially in the simplicity and the compact structural height of the drive system. In particularly preferred embodiments of the present invention, the workpiece lifting or stroke height considerably exceeds the structural height of the drive system, which is particularly advantageous for use in presses due to the space limitations.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 3 is a schematic view showing a double-ended workpiece conveying arrangement in a press constructed in accordance with the present invention which utilizes a plurality of the fixtures of FIGS. 1 and 2.

DETAILED DESCRIPTION OF THE DRAWINGS

Figure 1:
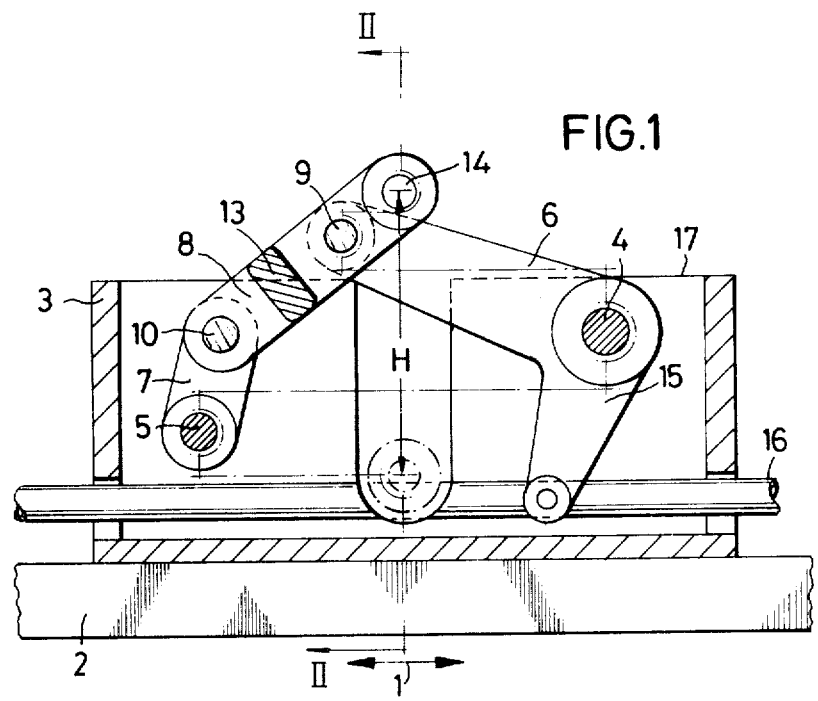
FIG. 1 is a partial sectional view taken along line I—I of FIG. 2 and showing a workpiece handling fixture constructed in accordance with the present invention.

Throughout the various views, similar reference numerals are used to depict similar features.

A bar or rail 2 reciprocatable in the conveying direction (see double arrow 1 in each of FIGS. 1 and 3) which is also called a gripper bar, carries at least one fixture having a fixture housing 3. In the housing 3, mutually parallel pins 4 and 5, respectively, are arranged, on which a lever fashioned as an angle lever 6 and a rocker arm 7 are respectively swingably disposed. A coupler 8 is articulated by means of a pin 9 to the angle lever 6 and by means of a further pin 10 to the rocker arm 7 and consists preferably of two legs 11, 12 (see FIG. 2), which legs are connected with each other by a web or crosspiece 13. At its free end, the leg 12 of the coupler 8 carries a lifting element 14. To provide service-free operation, the joints of the drive system are self-lubricating. By means of a rod 16 engaging the free leg 15 of the angle lever 6, the lever 6 is driven independently of the bar 2, but in synchronism with the reciprocating movements of the bar, in a reciprocating manner (swinging to and fro), for example by means of a cam drive or an articulated drive, optionally with idle times in the end positions. See copending commonly assigned application titled APPARATUS FOR THE MOVEMENTS OF A WORKPIECE IN A PRESS, filed Mar. 15, 1974, for details of a cam drive which could be used in effecting relative movement of rod 16 and rail 2 of the present application.

The drive of the lifting element 14 with a straight-line guide rod system as described above offers the special advantage of a very low structural height in the stroke direction. Although the lifting element 14 advantageously makes it possible to execute a relatively large stroke (H in FIG. 1), the drive is yet of such a low structure that the drive components, namely the angle lever 6 and the coupler 8, stand, in their bottom position, still underneath the top edge 17 of the fixture 3.

The lifting element 14, in its simplest form, is fashioned like a pin which, for example, extends under the workpiece or engages in openings of a lateral flange of a workpiece, so that the latter can be lifted, for example, out of an opened tool during the course of the stroke by pivoting of the angle lever 6 in the clockwise direction as a consequence of a motion of the rod 16 from the right toward the left. More complex forms of lifting elements are contemplated by the present invention which include a gripper of, for example, jaw shape, in order to seize the workpiece. Such a gripper is schematically shown in dot-dash lines in FIG. 2 and is guided in the stroke direction at the fixture 3.

Due to the limited space in a press laterally of the tool or die, the small structural height of the drive system of the work handling fixture of the present invention represents a special advantage, so that the lifting movements of the lifting element do not require an increase in the height of the tool space.

In case of workpieces having a larger length or in case of several workpieces, a plurality of fixtures 3 can be arranged on the bar to provide sufficient support, see FIG. 3. In this embodiment, the lifting elements are joined together by means of a rod or the like or they can be replaced by a pin 18 to which is articulated a rod 20 carrying the lifting elements, e.g. in the form of jaw-type grippers 19.

Figure 2:
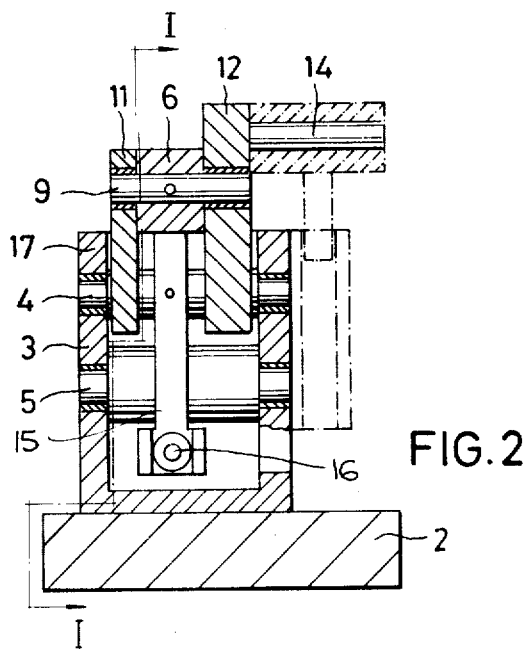
FIG. 2 is a partial sectional view taken along line II—II of FIG. 1.

In the embodiment of FIG. 3, a bar 2 is arranged on each side of the tools. The tools 21 are indicated by dashed lines, the workpieces 22 by dot-dash lines, and the press by four columns 23 of its frame. In this case, the bars 2 are reciprocated in the direction of the double arrow 1 to such an extent that the lifting elements 19 seize the workpiece or, in case of gang presses, the workpieces, 22 from below and lift same out of the tools 21 by a movement of the rod 20. Rod 20 is moved by the lifting elements 14 of the respective workpiece handling fixtures such as shown in FIGS. 1 and 2.

The present invention also contemplates embodiments where the bars 2 are movable in the conveying direction 1 in a reciprocating motion as well as toward each other and away from each other. During the movement toward the workpiece 22, the workpiece is seized by the grippers 19 mounted to the lifting element 14 and is lifted out of the tools 21 by the stroke motion of the fixture 3 (relative movement of rail 2 and rod 16). The thus-seized workpiece 22 is then fed, for example, during the following forward stroke of the bars 2, to the subsequent tool 21 of the press, where the lifting elements 14 are lowered by pivoting the angle lever 6 in the counterclockwise direction (by relative movement of rail 2 and rod 16), and thereby the workpiece 22 is inserted in the subsequent tool 21. The grippers 19 then release the workpiece 22 by a movement of the bars 2 away from each other, and the bars 2 execute a return stroke for the next seizing, lifting out, and conveying of the same or another workpiece. The lateral motion of the bars 2 toward the workpiece can be replaced by at least one gripper 19 carried by the lifting element 14 and being movable toward the workpiece and away therefrom by means of a pressure medium.

In the top half of FIG. 3, the fixture is shown with opened (maximally separated) bars 2, in the lower half with closed (minimally separated) bars 2 and with the grippers 19 in the engaging position at a workpiece 22.

From the last-explained possibilities for applying the present invention, a further advantage attained thereby becomes apparent. In conventional conveying means for workpieces in presses, the bars 2 carrying the grippers 19 must, in order to lift the workpieces 22 out of the tools 21, be simultaneously lifted and later lowered again. These movements, the drive systems required for this purpose, and the forces of inertia occurring during this process require complicated constructions which limit, in particular, the number of press strokes, as in gang presses, for example.

These drives, movements, and forces of inertia are eliminated in this invention, since the bars 2 need merely be moved in a horizontal plane, rather than in a three-dimensional path also in the stroke direction.

Furthermore, if it is desired, for example, in a press equipped with the apparatus of the present invention, to drag temporarily large-area pressed sheet-metal parts, e.g., for car bodies, through the bars 2 while guided within the press, i.e., to convey such parts in a merely horizontal direction, rather than being lifted and lowered, then the work handling fixtures of this invention are not operated during this mode of operation, but the transition from the three-dimensional conveying action to the dragging conveying action of the bars 2 is facilitated by the fact that in this case advantageously no drive components effecting the lifting motion need to be arrested or detached (disassembled, removed), since drive means for lifting motions of the bars 2, as mentioned above, are no longer required in the present invention. Solely the lifting element or elements 14 execute(s) the lifting and lowering motions for the workpieces 22.

While I have shown and described several embodiments in accordance with the present invention, it is understood that the same is not limited thereto but also contemplates numerous changes and modifications as would be known to those skilled in the art and I therefore do not wish to be limited to the details shown and described herein but intend to cover all such changes and modifications as are encompassed by the scope of the appended claims.

I claim:

1. Apparatus for lifting and conveying workpieces in a machine tool or the like, comprising:
    a bar reciprocably movable in the machine tool,
    and at least one work handling fixture attached to and movable with said bar, said work handling fixture including a lifting element directly engageable with a workpiece and a drive system for effecting workpiece lifting movements of said lifting element,
    wherein said drive system includes a driven lever and a rocker arm which are pivotal about mutually parallel axes and are joined together by a coupler means attached to said lifting element, said driven lever being pivotally joined to said coupler means at a position intermediate the attachment point of said lifting element and coupler means and the junction point of said coupler means and rocker arm.

2. Apparatus according to claim 1, wherein said work handling fixture includes a housing fixed to and movable with said bar, and wherein said mutually parallel axes are fixed in position with respect to said housing.

3. Apparatus according to claim 2, wherein said driven lever is a two armed lever having one arm attached to and movable with a driving rod and the other arm pivotally joined to the coupling means.

4. Apparatus according to claim 3, wherein said driving rod extends parallel to said bar and is movable with respect to said bar in a direction parallel thereto for effecting movement of said lifting element in a direction transverse to said bar.

5. Apparatus according to claim 4, wherein the housing extends transversely of said bar by a greater distance than does the rocker arm, coupler means, and driven lever when the drive system is in a position with said lifting element closest to said bar.

6. Apparatus according to claim 5, wherein said machine tool is a press, wherein the direction of movement of said bar is transverse to the stroke direction of said press, and wherein the direction of movement of said lifting element is parallel to the stroke direction of the press.

7. Apparatus according to claim 6, wherein at least one gripper member is carried by said lifting element to grip the workpiece.

8. Apparatus according to claim 6, wherein said lifting element carries at least one gripper member which is movable by means of a pressure medium toward and away from the workpiece.

9. Apparatus according to claim 6, wherein a plurality of said work handling fixtures are arranged in series along said bar in the reciprocating direction of said bar, and wherein lifting elements of said fixtures are connected together by means of a connecting rod.

10. Apparatus according to claim 6, wherein a plurality of said work handling fixtures are arranged in series along said bar in the reciprocating direction of said bar, and wherein the coupler means of a plurality of said fixtures are connected to at least one common lifting element.

11. Apparatus according to claim 6, wherein a pair of said bars with an associated at least one work handling fixture each are provided at respective opposite sides of said tool.

12. Apparatus according to claim 11, further comprising means for moving said bars toward and away from one another to effect joint handling of a workpiece disposed therebetween.

13. Apparatus according to claim 12, wherein a plurality of said work handling fixtures are arranged in series along said bar in the reciprocating direction of said bar, and wherein lifting elements of said fixtures are connected together by means of a connecting rod.

14. Apparatus according to claim 12, wherein a plurality of said work handling fixtures are arranged in series along said bar in the reciprocating direction of said bar, and wherein the coupler means of a plurality of said fixtures are connected to at least one common lifting element.

15. Apparatus according to claim 2, wherein the coupler means consists of two mutually parallel legs, said lifting element being attached to the end of one of said legs which faces away from the joint connecting the coupler means with the rocker arm, said last-mentioned one of said legs being longer than the other to accommodate attachment thereof to said lifting element.

16. Apparatus according to claim 1, wherein at least one gripper member is carried by said lifting element to grip the workpiece.

17. Apparatus according to claim 1, wherein said lifting element carries at least one gripper member which is movable by means of a pressure medium toward and away from the workpiece.

18. Apparatus according to claim 1, wherein a plurality of said work handling fixtures are arranged in series along said bar in the reciprocating direction of said bar, and wherein lifting elements of said fixtures are connected together by means of a connecting rod.

19. Apparatus according to claim 1, wherein a plurality of said work handling fixtures are arranged in series along said bar in the reciprocating direction of said bar, and wherein the coupler means of a plurality of said fixtures are connected to at least one common lifting element.

20. Apparatus according to claim 1, wherein a pair of said bars with an associated at least one work handling fixture each are provided at respective opposite sides of said tool.

21. Apparatus according to claim 20, further comprising means for moving said bars toward and away from one another to effect joint handling of a workpiece disposed therebetween.

* * * * *